No. 787,360.

Patented April 18, 1905.

UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF MAKING DIALKYL-BARBITURIC ACID.

SPECIFICATION forming part of Letters Patent No. 787,360, dated April 18, 1905.

Application filed January 5, 1905. Serial No. 239,788.

*To all whom it may concern:*

Be it known that I, MAX ENGELMANN, residing at Elberfeld, Germany, (assignor to the FARBENFABRIKEN OF ELBERFELD CO., of New York,) have invented a new and useful Improvement in Processes of Preparing Dialkyl-Barbituric Acids; and I do hereby declare the following to be an exact and clear description of my invention.

My invention relates to a new process for the production of dialkyl-barbituric acids (2-4-6-trioxy-5-dialkylpyrimidins) having the following general formula:

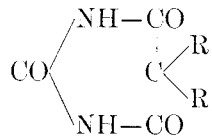

(R meaning alkyl radicals) which bodies possess valuable therapeutic, especially soporific, properties. The process for the preparation of these compounds consists in first condensing dicyandiamid with dialkylated malonitrils of the general formula:

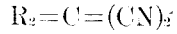

by means of alkaline condensing agents and then splitting off the cyanimino group and the imino groups and replacing them by oxygen in 2- 4- and 6- position from the resulting 2-cyanimino-4-6-diimino-5-dialkylpyrimidins of the general formula:

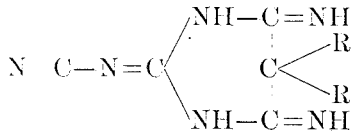

by treatment with acids.

In order to carry out my process practically, I can, for instance, proceed as follows: Forty-two parts of dicyandiamid and sixty-one parts of diethyl-malonitril are added to a solution of thirty-nine parts of potassium in one thousand parts of alcohol, and the resulting mixture is heated for four to five hours to 120° centigrade in an autoclave. The alcohol is distilled off, and the resulting residue is dissolved in water and neutralized by means of dilute hydrochloric acid. After a recrystallization from hot water the new body is obtained in the shape of crystals melting at 270° centigrade. For the saponification ten parts of the 2-cyanimino-4-6-diimino-5-diethylpyrimidin thus produced are heated with thirty parts of a forty-per-cent. sulfuric acid for three hours to 110° centigrade. After cooling it is filtered off and the diethyl-barbituric acid thus precipitated is purified by a recrystallization from water.

Instead of an alcoholic solution of potassium ethylate other alkaline condensing agents—such as solid alkaline alcoholates, sodium amid, or the like—can be employed.

The saponification can also be carried out with other acids, such as hydrochloric acid, oxalic acid, or the like.

The process proceeds in an analogous manner for the production of other dialkyl-barbituric acids, such as the dipropyl or the dimethyl-barbituric acid, or the like.

Having now described my invention and in what manner the same is to be performed, what I claim as new, and desire to secure by Letters Patent, is—

1. The process for the production of dialkyl-barbituric acids having the above-given general formula, which process consists in first condensing dicyandiamid with dialkylated malonitrils by means of alkaline condensing agents and then splitting off the cyanimino group and the imino groups in 2- 4- and 6- position from the resulting 2-cyanimino-4-6-diimino-5-dialkyl-pyrimidins by treatment with acids, substantially as hereinbefore described.

2. The process for the production of diethyl-barbituric acid, which process consists in first condensing dicyandiamid with diethyl-malonitril by means of alkaline condensing agents, and then splitting off the cyanimino and the imino groups in 2- 4- and 6- position from the resulting 2-cyanimino-4-6-diimino-5-diethyl-pyrimidin by treatment with acids, substantially as hereinbefore described.

3. The process for the production of diethyl-barbituric acid, which process consists in first condensing dicyandiamid with diethyl-malonitril by means of potassium ethylate and then splitting off the cyanimino group and the imino groups in 2-, 4- and 6- position from the resulting 2-cyanimino-4-6-diimino-5-diethyl-pyrimidin by treatment with hot sulfuric acid, substantially as hereinbefore described.

In testimony whereof I have signed my name in the presence of two subscribing witnesses.

MAX ENGELMANN.

Witnesses:
OTTO KÖNIG,
PAUL HODEIGE.